US009678492B2

(12) United States Patent
Obermeier et al.

(10) Patent No.: US 9,678,492 B2
(45) Date of Patent: Jun. 13, 2017

(54) DYNAMIC CONFIGURATION OF AN INDUSTRIAL CONTROL SYSTEM

(71) Applicant: ABB RESEARCH LTD, Zürich (CH)

(72) Inventors: Sebastian Obermeier, Schinznach-Dorf (CH); Hadeli Hadeli, Baden (CH); Michael Wahler, Baden (CH); Sascha Stoeter, Zürich (CH); Ana Hristova, Baden (CH)

(73) Assignee: ABB Research Ltd., Zurich (CH)

( * ) Notice: Subject to any disclaimer, the term of this patent is extended or adjusted under 35 U.S.C. 154(b) by 377 days.

(21) Appl. No.: 14/449,762

(22) Filed: Aug. 1, 2014

(65) Prior Publication Data

US 2014/0343732 A1 Nov. 20, 2014

Related U.S. Application Data

(63) Continuation of application No. PCT/EP2013/051895, filed on Jan. 31, 2013.

(30) Foreign Application Priority Data

Feb. 1, 2012 (EP) ..................................... 12153487

(51) Int. Cl.
  *G05B 15/02* (2006.01)
  *H04L 29/06* (2006.01)
  *G05B 19/042* (2006.01)

(52) U.S. Cl.
  CPC .......... *G05B 15/02* (2013.01); *G05B 19/0428* (2013.01); *H04L 63/20* (2013.01)

(58) Field of Classification Search
  CPC ...... G05B 15/02; G05B 19/0428; H04L 63/20
  See application file for complete search history.

(56) References Cited

U.S. PATENT DOCUMENTS 6,751,562 B1   6/2004 Blackett et al.
7,970,871 B2 *  6/2011 Ewing ................... G01D 21/00
                                                     702/104

(Continued)

FOREIGN PATENT DOCUMENTS

CN    1232556 A    10/1999
CN    1820262 A     8/2006

(Continued)

OTHER PUBLICATIONS

European Search Report mailed on Jun. 29, 2014, Application No. 121534787.9.

(Continued)

*Primary Examiner* — Ramesh Patel
(74) *Attorney, Agent, or Firm* — Taft Stettinius & Hollister LLP

(57) ABSTRACT

A controller module, method, and a non-transitory computer program product are disclosed for the dynamic configuration of an industrial control system, which can include a current settings receiver configured to receive current configuration and security settings of the industrial control system, a changed settings receiver configured to receive changed configuration settings of the industrial control system, a settings analyzer configured to determine, based on the current configuration and security settings and the changed configuration settings, updated configuration and security settings of the industrial control system, and a dynamic activator configured to dynamically establish at least one communication path in order to activate updated configuration and security settings of the industrial control system.

18 Claims, 7 Drawing Sheets

(56) References Cited

U.S. PATENT DOCUMENTS

| | | | |
|---|---|---|---|
| 8,909,926 B2* | 12/2014 | Brandt | H04L 63/1408 709/205 |
| 2005/0015624 A1 | 1/2005 | Ginter et al. | |
| 2005/0182969 A1 | 8/2005 | Ginter et al. | |
| 2006/0236374 A1* | 10/2006 | Hartman | H04L 12/2602 726/3 |
| 2007/0294369 A1 | 12/2007 | Ginter et al. | |
| 2008/0012703 A1* | 1/2008 | Falavigna | G05B 23/0229 340/540 |
| 2008/0209033 A1 | 8/2008 | Ginter et al. | |
| 2009/0077662 A1 | 3/2009 | Law et al. | |
| 2011/0039237 A1* | 2/2011 | Skare | G05B 23/0267 434/118 |
| 2011/0307936 A1 | 12/2011 | Braendle et al. | |
| 2012/0167162 A1* | 6/2012 | Raleigh | G06F 21/57 726/1 |
| 2012/0197792 A1* | 8/2012 | Raleigh | G06Q 10/06375 705/40 |
| 2012/0198541 A1* | 8/2012 | Reeves | H04L 63/0227 726/13 |
| 2013/0007693 A1* | 1/2013 | Bliss | G06F 8/63 717/101 |
| 2013/0139215 A1* | 5/2013 | Hu | H04L 63/20 726/1 |
| 2014/0075498 A1* | 3/2014 | Porras | H04L 63/107 726/1 |
| 2014/0122855 A1* | 5/2014 | Maneval | G06F 9/4401 713/1 |
| 2014/0304403 A1* | 10/2014 | Hadeli | H04L 41/145 709/224 |

FOREIGN PATENT DOCUMENTS

| | | |
|---|---|---|
| EP | 1 881 388 A1 | 1/2008 |
| EP | 2 068 215 A2 | 6/2009 |
| WO | WO 2009/128905 A1 | 10/2009 |
| WO | WO 2010/069698 A1 | 6/2010 |

OTHER PUBLICATIONS

International Search Report (PCT/ISA/210) mailed on Apr. 11, 2013, by the European Patent Office as the International Searching Authority for International Application No. PCT/EP2013/051895.

Written Opinion (PCT/ISA/237) mailed on Apr. 11, 2013, by the European Patent Office as the International Searching Authority for International Application No. PCT/EP2013/051895.

* cited by examiner

```xml
<?xml version="1.0" encoding="utf-8"?>
<configuration host="Host 1" IP="10.0.0.1">
    <components>
      <component id="A" description="components/Component_A.xml">
      </component>
      <component id="Net Proxy"
description="components/Network_Proxy.xml">
          <target host="10.0.0.2" port="80" />
      </component>
    </components>
    <channels>
      <channel id="channel_1" size="100">
        <source component="A" block="a" port="out" />
        <destination component="Net Proxy" block="send" port="in"
/>
      </channel>
    </channels>
    <schedule>
      <sequential>
        <execute component="A" block="a" />
        <execute component="Net Proxy" block="send" />
      </sequential>
    </schedule>
</configuration>
```

Fig. 5

```xml
<?xml version="1.0" encoding="utf-8"?>
<configuration host="Host 2" IP="10.0.0.2">
    <components>
      <component id="B" description="components/Component_B.xml">
      </component>
      <component id="Net_Proxy"
description="components/Network_Proxy.xml">
          <source port="80" />
      </component>
    </components>
    <channels>
      <channel id="channel_1" size="100">
        <source component="Net_Proxy" block="receive" port="out"
/>
        <destination component="B" block="b" port="in" />
      </channel>
    </channels>
    <schedule>
      <sequential>
        <execute component="Net_Proxy" block="receive" />
        <execute component="B" block="b" />
      </sequential>
    </schedule>
</configuration>
```

Fig. 6

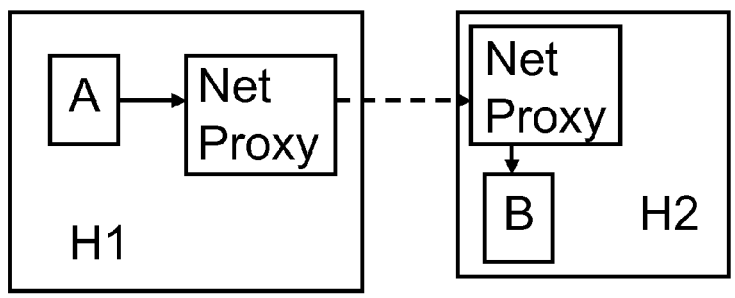
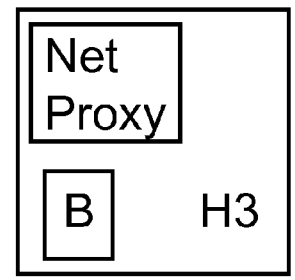
Fig. 7
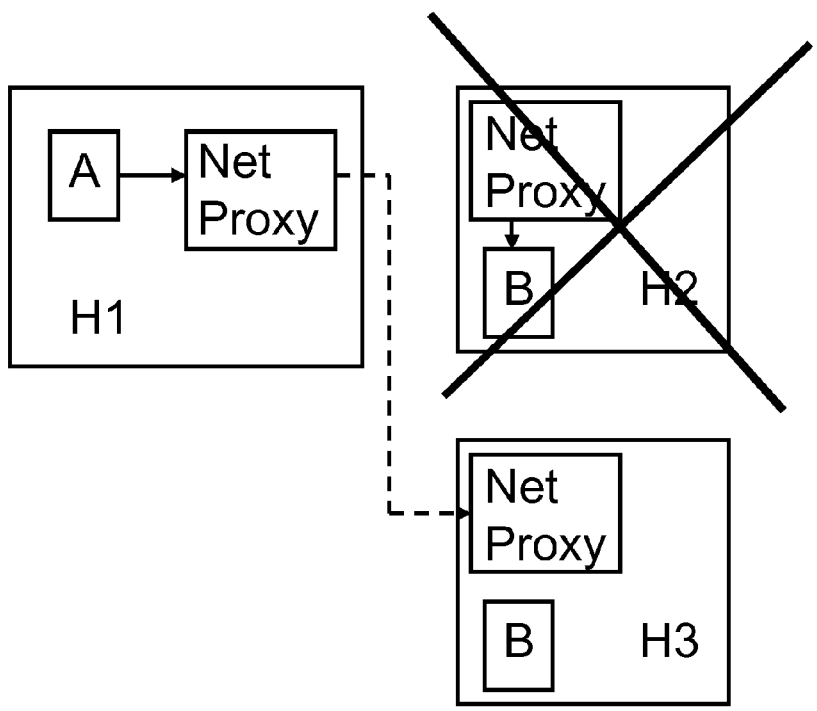
Fig. 8

```xml
<?xml version="1.0" encoding="utf-8"?>
<configuration host="Host 1" IP="10.0.0.1">
    <components>
      <component id="A" description="components/Component_A.xml">
      </component>
      <component id="Net Proxy"
description="components/Network_Proxy.xml">
          <target host="10.0.0.3" port="80" />
      </component>
    </components>
    <channels>
      <channel id="channel_1" size="100">
        <source component="A" block="a" port="out" />
        <destination component="Net Proxy" block="send" port="in"
/>
      </channel>
    </channels>
    <schedule>
      <sequential>
        <execute component="A" block="a" />
        <execute component="Net Proxy" block="send" />
      </sequential>
    </schedule>
</configuration>
```

Fig. 9

```xml
<?xml version="1.0" encoding="utf-8"?>
<configuration host="Host 3" IP="10.0.0.3">
    <components>
      <component id="B" description="components/Component_B.xml">
      </component>
      <component id="Net_Proxy"
description="components/Network_Proxy.xml">
          <source port="80" />
      </component>
    </components>
    <channels>
      <channel id="channel_1" size="100">
        <source component="Net_Proxy" block="receive" port="out"
/>
        <destination component="B" block="b" port="in" />
      </channel>
    </channels>
    <schedule>
      <sequential>
        <execute component="Net_Proxy" block="receive" />
        <execute component="B" block="b" />
      </sequential>
    </schedule>
</configuration>
```

Fig. 10

DYNAMIC CONFIGURATION OF AN INDUSTRIAL CONTROL SYSTEM

RELATED APPLICATION(S)

This application claims priority as a continuation application under 35 U.S.C. §120 to PCT/EP2013/051895, which was filed as an International Application on Jan. 31, 2013, designating the U.S., and which claims priority to European Application No. 12153487.9 filed in Europe on Feb. 1, 2012. The entire contents of these applications are hereby incorporated by reference in their entireties.

FIELD

The present disclosure relates to a controller module for the dynamic configuration of an industrial control system. The disclosure also relates to a method for dynamic configuration of an industrial control system.

BACKGROUND INFORMATION

Control systems can be deployed to control industrial processes in various industries, for example, in the automotive industry, in energy transportation, in life science solutions, in power generation, in process automation, or in the water industry. Known control systems can be configured once during the engineering process and may include an engineering environment for running the control system and several control devices for controlling an industrial process. The engineering environment and the control devices can be connected via a network, which can include network control devices to provide the communication infrastructure for running the control system. Moreover, security controllers can be included for network protection.

WO 2010/069698 discloses a technique for automatic network analysis, in which network specification information can be converted into a single intermediate representation of the network. The intermediate representation can be used to determine security parameters and expected data traffic parameters. The security parameters can be used to configure security measures, such as configuring a firewall or an intrusion detection unit. Data traffic may be monitored and lack of expected data traffic signaled. The technique can provide for automatically configuring or adapting cyber security measures in a deployed control system, but does not provide for a dynamic configuration of the control system itself.

SUMMARY

A method is disclosed for dynamic re-configuration of an industrial control system including production control units interconnected via network units, comprising: determining current configuration and security settings of the industrial control system; proposing changes to a production control unit of the industrial control system; determining, based on the current configuration and security settings and the proposed changes, updated configuration and security settings for the network units of the industrial control system; and dynamically establishing at least one communication path to the production control unit, by activating the updated configuration and security settings for the network units of the industrial control system.

A controller module is disclosed for the dynamic configuration of an industrial control system, comprising: a current settings receiver configured to receive current configuration and security settings of the industrial control system; a changed settings receiver configured to receive changed configuration settings of the industrial control system; a settings analyzer configured to determine, based on the current configuration and security settings and the changed configuration settings, updated configuration and security settings of the industrial control system; and a dynamic activator configured to dynamically establish at least one communication path in order to activate the updated configuration and security settings of the industrial control system.

A computer program product is disclosed comprising a non-transitory computer-readable medium having stored thereon computer program code which upon execution will cause a controller module to: receive current configuration and security settings of an industrial control system; receive changed configuration settings of the industrial control system; determine, based on current configuration and security settings and changed configuration settings, updated configuration and security settings of the industrial control system; and dynamically establish at least one communication path in order to activate the updated configuration and security settings of the industrial control system.

BRIEF DESCRIPTION OF THE DRAWINGS

The subject matter of the disclosure will be explained in more detail in the following text with reference to exemplary embodiments, which are illustrated in the attached drawings, in which:

FIG. 5 shows an exemplary configuration file of a first host;

FIG. 6 shows an exemplary configuration file of a second host;

FIG. 7 shows an exemplary environment with an application running on two hosts;

FIG. 8 shows the exemplary environment after breakdown of the second host;

FIG. 9 shows an exemplary configuration file of the first host after breakdown of the second host;

FIG. 10 show an exemplary configuration file of the third host after breakdown of the second host;

DETAILED DESCRIPTION

Figure 1:
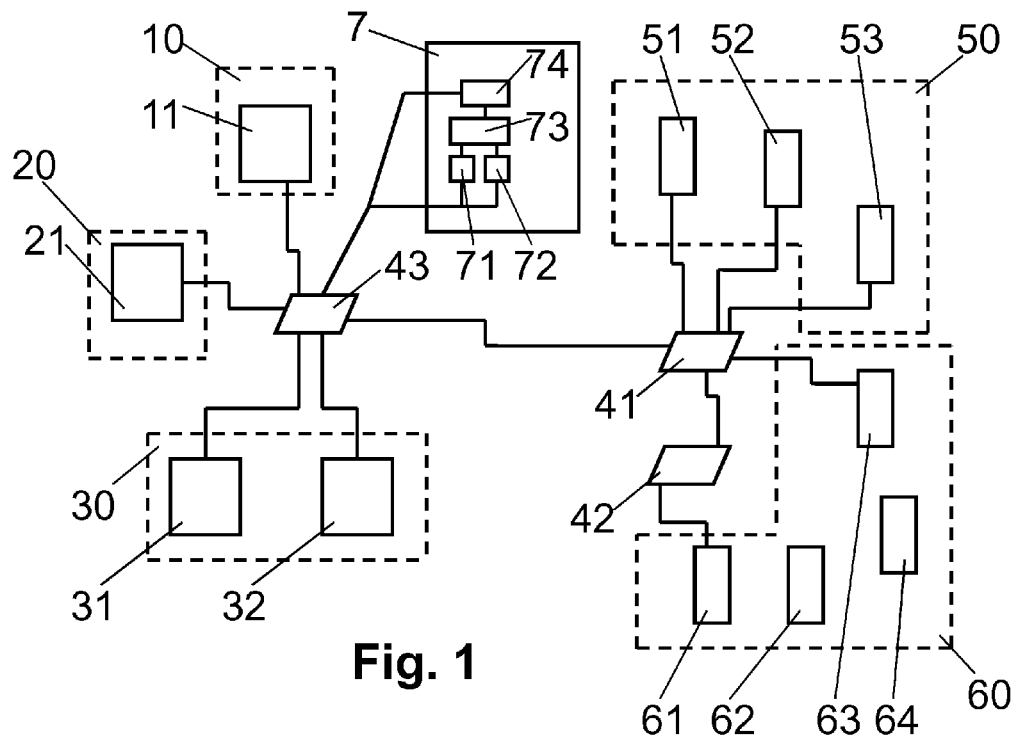
FIG. 1 shows an exemplary industrial control system including a first and a second production environment zone.

In accordance with an exemplary embodiment, a controller module and a method for dynamic configuration of an industrial control system are disclosed, which can include a controller module and a method for dynamic configuration of an industrial control system, wherein the industrial control system may be dynamically reconfigured with the security of the industrial control system can be continuously enabled.

In accordance with an exemplary embodiment, a method for dynamic reconfiguration of an industrial control system including production control units interconnected via network units is disclosed, and wherein the following steps can be performed: determining, repeatedly, current configuration and security settings of the industrial control system; proposing, or specifying, or requesting, changes to a specific production control unit of the industrial control system, wherein such changes may also be referred to as changed configuration settings; determining, on the basis of the current configuration and security settings and the proposed changes, updated configuration and security settings for the network units of the industrial control system; and dynamically establishing at least one communication path to the specific production control unit, by activating or implementing the updated configuration and security settings for the network units of the industrial control system. The communication path may be configured on a temporary basis from a change manager of the industrial control system to the specific production control unit, or on a permanent basis from a peer production control unit to the specific production control unit.

In accordance with an exemplary embodiment of the method, an application of the industrial control system can include first and second components or tasks that are executed on first and second hosts or host production control units, respectively, and the method can include: proposing changes including re-assignment of the second component from the second host to a third host of the industrial control system, and establishing a communication path from the first host to the third host by activating the updated configuration and security settings for the network units of the industrial control system.

In accordance with an exemplary embodiment, a controller module is disclosed for the dynamic configuration of an industrial control system, which can include: a current settings receiver configured to receive current configuration and security settings of the industrial control system; a changed settings receiver configured to receive changed configuration settings of the industrial control system; a settings analyzer configured to determine, on the basis of the current configuration and security settings and the changed configuration settings, updated configuration and security settings of the industrial control system; and a dynamic activator configured to dynamically establish at least one communication path in order to activate the updated configuration and security settings of the industrial control system.

In accordance with an exemplary embodiment, an operator of the industrial control system may require changed configuration settings. For example, in case of the failure of components of the industrial control system, changed settings can be used as well. The settings analyzer can determine updated configuration and security settings on the basis of current security settings and therefore security in the industrial control system may be maintained. The dynamic activator may establish one or more communication paths according to a security standard. The communication paths may be established only temporarily during dynamic configuration of the industrial control system or they may be established permanently, for example in case of the failure of a component such that communication may be rerouted through the newly established communication channel. The industrial control system may therefore be dynamically configured according to specific security settings and therefore a security level can be maintained.

In accordance with an exemplary embodiment, the changed settings receiver can be configured to capture changed configuration settings transmitted by a change manager system. For example, in case an operator needs a new configuration of the industrial control system on the basis of changed configuration settings, the settings analyzer can determine updated configuration and security settings, which can then be activated by the dynamic activator while maintaining a security level according to the security settings. Hence, the operator does not have to take care about the security level, but only about the configuration of the industrial control system.

In accordance with an exemplary embodiment, the changed settings receiver can be configured to receive changed configuration settings caused by a change in the status of at least one of: network units and production control units of the industrial control system. For example, a change in the status may occur due to a failure of a production control unit, as, for example, a system crash, a network cable failure, or a malfunction due to a system compromise. For example, in case a component of the industrial control system detects a status change, for example because another component does not respond anymore, corresponding changed configuration settings may be transmitted, which, when received by the changed settings receiver, will initiate a dynamic configuration of the industrial control system accordingly.

In accordance with an exemplary embodiment, the settings analyzer can be configured to determine updated configuration and security settings on the basis of at least one of: redundant network units and redundant production control units of the control system. A redundant network unit or a redundant production control unit may be designed such that, depending on selected configuration and security settings, different applications and functionalities may be provided. Hence, a redundant network unit or a redundant production control unit may serve to replace failed components of the industrial control system, wherein a configuration is provided while maintaining a security level.

In accordance with an exemplary embodiment, the dynamic activator can be configured to open at least one temporary communication path between the settings activator and at least one of: network units and production control units of the control system in order to activate updated configuration and security settings of the control system. The at least one temporary communication path may be secured according to a security level. Hence, when putting into effect the updated configuration and security settings, the industrial control system may be dynamically configured while maintaining a security level.

In accordance with an exemplary embodiment, the changed settings receiver can be configured to receive changed security settings of the control system, and wherein the settings analyzer is configured to determine, on the basis of changed security settings, updated configuration and security settings of the control system. Accordingly, the security level may be increased or decreased according to dynamic conditions, such as, for example, the settings analyzer may detect on the basis of changed configuration settings or changed security settings a system compromise, which may require an increased security level for the industrial control system such that the system compromise may be defeated.

In accordance with an exemplary embodiment, the controller module can include an updated settings transmitter for transmitting updated configuration and security settings to a change manager system. Hence, for example, all changes in the configuration and security settings may be transparently transmitted to a change manager system and therefore may be verified by an operator of the change manager system.

In accordance with an exemplary embodiment, the controller module for the dynamic configuration of an industrial control system is disclosed, which can include a method for the dynamic configuration of an industrial control system and to a computer program product including a computer-readable medium having stored thereon computer program code.

In accordance with an exemplary embodiment, a method for the dynamic configuration of an industrial control system is disclosed, which includes: receiving current configuration and security settings of the industrial control system; receiving changed configuration settings of the industrial control system; determining, on the basis of current configuration and security settings and changed configuration settings, updated configuration and security settings of the industrial control system; and dynamically establishing at least one communication path in order to activate the updated configuration and security settings of the industrial control system. In accordance with an exemplary embodiment, the method can include: capturing changed configuration settings transmitted by a change manager system. In accordance with an exemplary embodiment, the method can include: detecting changed configuration settings caused by a change in the status of at least one of: network units and production control units of the industrial control system. In accordance with an exemplary embodiment, the method can include: determining updated configuration and security settings on the basis of at least one of: redundant network units and redundant production control units of the control system. In accordance with an exemplary embodiment, the method can include: opening at least one temporary communication path in order to activate updated configuration and security settings of the control system. In accordance with an exemplary embodiment, the method can include: transmitting updated configuration and security settings to a change manager system.

In accordance with an exemplary embodiment, a computer program product is disclosed, which includes a computer-readable medium having stored thereon computer program code which directs a controller module: to receive current configuration and security settings of the industrial control system; to receive changed configuration settings of the industrial control system; to determine, on the basis of current configuration and security settings and changed configuration settings, updated configuration and security settings of the industrial control system; and to dynamically establish at least one communication path in order to activate the updated configuration and security settings of the industrial control system.

FIG. 1 shows schematically an exemplary industrial control system, which includes a first production environment zone 50 and a second production environment zone 60. The first production environment zone 50 includes first, second, and third production control units 51, 52, 53. The second production environment 60 includes first, second, third, and fourth production control units 61, 62, 63, 64. The production control units 51, 52, 53, 61, 62, 63, 64 can provide production control applications and functionalities used for running the industrial control system. The production control units 51, 52, 53, 61, 62, 63, 64 may relate to software modules running on a computer, to hardware modules including one or more logic circuits, to a single core in a multi-core processor, to a single virtual machine on top of a virtual server, to a combination thereof, or to any other unit providing the applications and functionalities for running the industrial control system.

As indicated schematically in FIG. 1, the production control units 51, 52, 53, 61, 62, 63, 64 may be connected to a first and a second network unit 41, 42. The first and the second network unit 41, 42 may provide networking and security functionalities to the production control units 51, 52, 53, 61, 62, 63, 64. For example, security settings may have been activated in such a manner that no data from the first production environment zone 50 may flow to the second production environment zone 60 and vice-versa.

As indicated schematically in FIG. 1, an engineering environment zone 10, an office environment zone 20, and other peripherals zone 30 may be provided. The engineering environment zone 10 may include an engineering workstation 11, the office environment zone may include an office workstation 21, and the other peripherals zone 30 may include a first and a second other peripheral 31, 32. The engineering workstation (or change manger system) 11 and the office workstation 21 may relate to any workstation, as for example a PC (PC: personal computer). The other peripherals 31, 32 may relate to any other peripheral, as for example a printer, a plotter, and a network attached storage. The engineering workstation 11, the office workstation 21, and the other peripherals 31, 32 may be connected to a third network unit 43, which may provide networking and security functionalities. The third network unit 43 may be connected to the first network unit 41 in order to provide networking and security functionalities between the industrial control system including the first and second production zone 50, 60 and the engineering environment zone, the office environment zone 20 as well as the other peripherals zone 30.

The first, second and third network unit 41, 42, 43 may be connected through a network separated from the industrial control system. Alternatively, the industrial control system may provide network connection between the first, second, and third network unit 41, 42, 43.

For example, the first, second, and third network unit 41, 42, 43 may include any router device, switching device, firewall, access control device or corresponding modules in order to provide networking and security functionalities. Moreover, networking and security functionalities of the first, second, and third network unit 41, 42, 43 may be configured through configuration and security settings, which may include, for example, firewall rules, and access control lists.

As indicated schematically in FIG. 1, a controller module 7 is arranged for the dynamic configuration of the industrial control system including the first and second production zone 50, 60. The control module 7 may be connected to the first network unit 41, for example. The control module 7 includes a current settings receiver 71 configured to receive current configuration and security settings of the industrial control system. The current configuration and security settings may be received upon a broadcast request, for example, such that all components of the industrial control system send their current configuration and security settings to the control module 7. Alternatively, the current configuration and security settings may have been obtained by constantly receiving and analyzing network traffic, such that initial configuration and security settings of the industrial control system have been constantly updated to the current configuration and security settings.

As indicated schematically in FIG. 1, the controller module 7 can include a changed settings receiver 72 configured to receive changed configuration settings. For example, the changed settings receiver 72 may be configured to receive all traffic from the engineering workstation 11 relating to configuration changes of the control system, which may originate from commands of an operator of the engineering workstation 11. Alternatively, the changed settings receiver 72 may be configured, for example, to receive notifications relating to status changes of the network units 41, 42, 43 and/or the production control units 51, 52, 53, 61, 62, 63, 64. For example, status changes may relate to failure or malfunction of network units 41, 42, 43 and/or production control units 51, 52, 53, 61, 62, 63, 64, for example. Malfunction of a unit may include internal flooding of a production environment zone, contamination of a unit by a virus or worm.

As indicated schematically in FIG. 1, the controller module 7 can include a settings analyzer 73 configured to determine on the basis of current configuration and security settings and changed configuration settings updated configuration and security settings of the industrial control system. For example, as soon as the engineering workstation 11 transmits changed configuration settings in order to modify the configuration of the industrial control system, such changed configuration settings are received by the changed settings receiver 72 and further transmitted to the settings analyzer 73, which analyzes the changed configuration settings and determines updated configuration and security settings on the basis of the current configuration and security settings and the changed configuration settings.

As indicated schematically in FIG. 1, the controller module 7 can include a settings activator 74 for activating updated configuration and security settings of the industrial control system. For example, according to changed configuration settings transmitted by the engineering workstation 11 and/or because of changed configuration settings of network units and/or production control units, configuration settings and security settings are activated to dynamically configure the industrial control system, wherein the industrial control system operates according to a configuration and according to a needed security.

In accordance with an exemplary embodiment, the controller module 7 may be implemented by way of a programmed software module including computer program code to control one or more processors of a computer. In an exemplary embodiment, the controller module 7 can be implemented by way of a programmed software module running on the engineering workstation 11.

The controller module 7 according to the disclosure can enable the execution of real-time control applications and can offer dynamic reconfiguration (for example, for balancing the CPU load of multiple units) and patching of the control system at the same time without interrupting the production process. Moreover, the desired settings of network units 41, 42, 43 and/or production control units 51, 52, 53, 61, 62, 63, 64 can be automatically adapted to the underlying dynamic changes in the industrial control system environment. This can help ensure an improved cyber security resilience against system compromise that may appear due to such changes and reduces the attack surface as security settings allow only needed data transfer.

Known industrial control systems can be configured once during the engineering process (and manually re-configured when desired or appropriate). The present disclosure provides that applications and/or functionalities can be automatically and dynamically configured at runtime, for example, without having to stop the industrial control system. This flexibility can enable functions and/or applications to be updated, to be moved, to be changed on the fly, for example, during the operation of the industrial control system.

Figure 2:
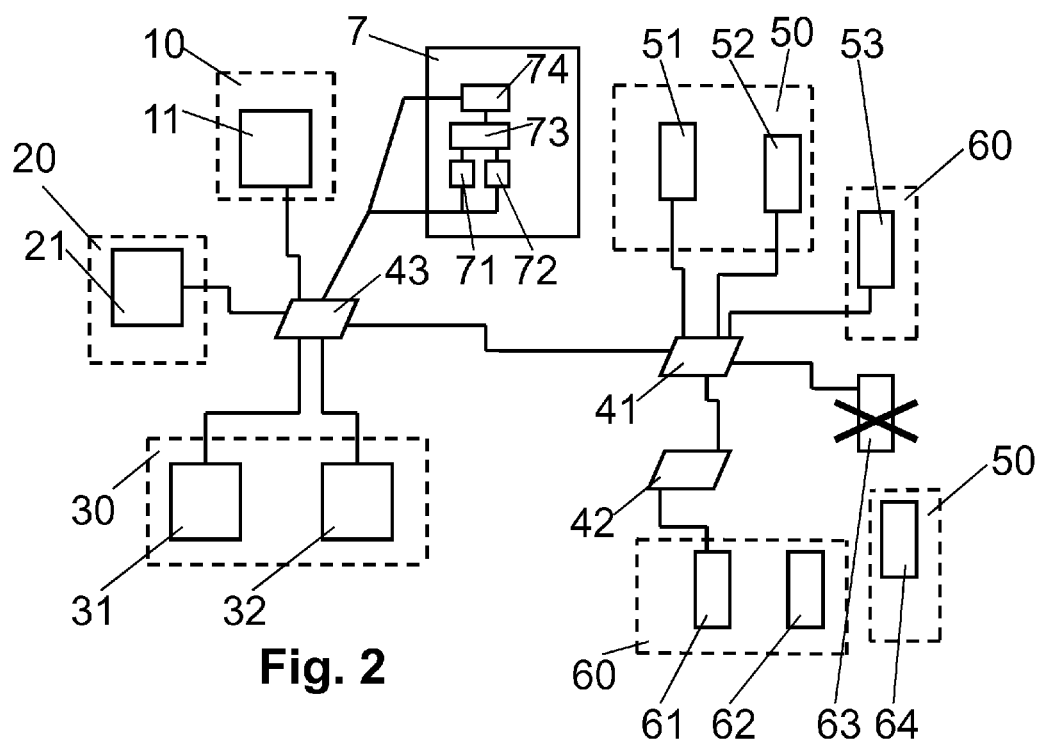
FIG. 2 shows the exemplary industrial control system after an exemplary breakdown of a production control unit.

FIG. 2 shows the industrial control system of FIG. 1 after an exemplary breakdown of the third production control unit 63 of the second production environment 60. In accordance with an exemplary embodiment, the industrial control system has been dynamically reconfigured by the controller module 7, wherein in this example the third production control unit 53 formerly belonging to the first production zone 50 now performs functions of the second production zone 60, and wherein the fourth production control unit 64 now performs functions of the first production zone 50.

Figure 3:
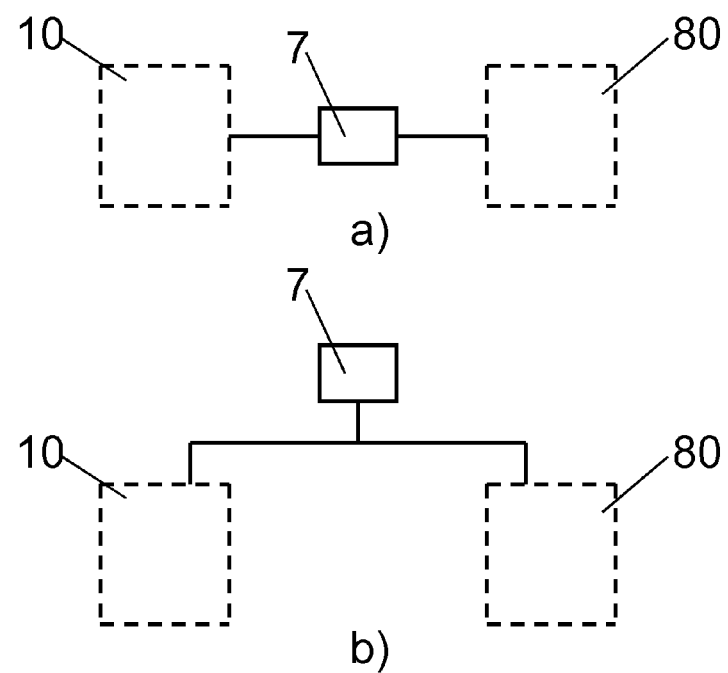
FIG. 3 shows schematically possibilities of the location of an exemplary controller module according to the disclosure.

FIG. 3 shows schematically possibilities of the location of the controller module 7. In accordance with an exemplary embodiment, the controller module 7 can be located between the engineering environment zone 10 and one or more production zones 80 of the industrial control system. In accordance with an exemplary embodiment, the controller module 7 can be placed at a location where the entire network may be monitored. The location of the controller module 7 can help ensure that all network traffic related to changes in the industrial control system may be monitored.

In accordance with an exemplary embodiment, the controller module 7 may act as an authentication and authorization gateway as well, wherein the engineering workstation 11, the network units 41, 42, 43, the production units 51, 52, 53, 61, 62, 63, 64, and/or operators of the engineering workstation 10 are authenticated/authorized. With this information the controller module can determine the appropriate communication and is able to open the network units 41, 42, 43 for the reconfiguration traffic, for example. The design of the controller module 7 may be secured, for example by applying encryption to the communication channels and by applying proper authentication, authorization and/or accounting mechanisms.

In accordance with an exemplary embodiment, the controller module 7 can shield the complexity for managing an industrial control system, as configuration and security settings can be automatically adapted to changed configuration settings. The controller module 7 can allow data, which flows to the production environment zones of the industrial control system to be properly modified, so that only required traffic is flowing. This automatically reduces the attack surface as only the data traffic that is desired or mandatory is permitted. For example, it is not uncommon that configuration or security settings are misconfigured and too much data is broadcasted to other units, which may get flooded and may therefore have problems in identifying important data. The same can happen in case of malicious modifications by a disgruntled insider. For example, in this case, the controller module 7 can provide that damage can be limited as it allows only that kind of communication that has been identified as crucial for operation of the industrial control system. In accordance with an exemplary embodiment, according to the controller module 7, configuration settings may be separated from the security settings while still having full knowledge of the current configuration and security settings of the industrial control system. The operator or expert who changes the configuration settings and accordingly the production environment does not have to modify the security settings. In accordance with an exemplary embodiment, a compromised change manager system 11 will not result in flooding towards the industrial control system, as the change manager system 11 cannot open arbitrary data transfer paths with or inside a production environment zone, as these settings are determined on the bases of the current settings, which means that a virus or Trojan cannot reach the industrial control system. Additionally, the change manager system 11 may test if updated configuration and security settings are reasonable, for example if the CPU of a production control unit 51, 52, 53, 61, 62, 63, 64 can be sufficiently powerful to execute additional functionalities.

In accordance with an exemplary embodiment, the controller module 7 according to the disclosure can differ from known solutions by: the controller module 7 integrates control system configuration and network information. The controller module 7 can leverage the control system configuration to automatically determine the required communication paths inside the industrial control system and configures the individual units to reflect that. Changed settings may be dynamically inspected. The use of authentication schemas may verify users and units at runtime. The controller module 7 can be used as a "man-in-the-middle" that receives all changes from the change manager system 11, derives the needed configuration and security settings for the industrial control system, and then performs the reconfiguration of the industrial control system, for example, the reconfiguration of the network units 41, 42, 43 and of the production control units 51, 52, 53, 61, 62, 63, 64. In addition, the controller module 7 may analyze the current configuration and security settings and may derive the required data flows between the different units to perform required changes. Based on this analysis, network units may be configured to reject data that has not been identified to be required. This differs from traditional firewalls/switches, which do not take into account the industrial control system. The controller module 7 can also inspect all changes and matches them with roles, which means that not only the change manger system 11 checks if a certain user is allowed to perform a certain change, also the controller module 7 may perform that check additionally, which can add an additional layer of security.

Figure 4:
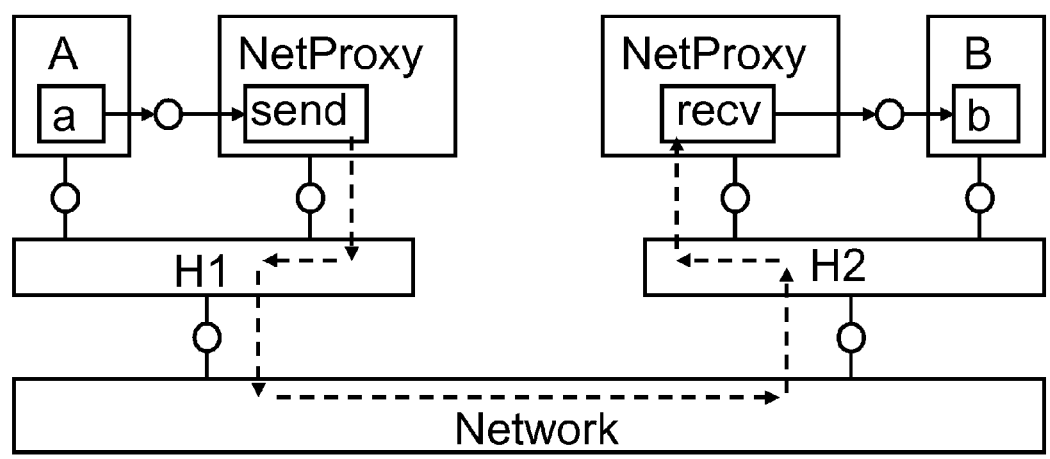
FIG. 4 shows an example of an exemplary dynamic control system application running on two hosts.

FIG. 4 shows an example of a dynamic control system application running on two hosts, namely a first host H1 and a second host H2, which may be configured to provide applications and functionalities for running an industrial control system. The application, which may relate to a production control unit of the industrial control system, has a first component A and a second component B, with their own control block each, namely the first control block a and the second control block b. In order to support communication between these two blocks, a Net Proxy component may include a send block in the schedule of the first host H1. After block a, another Net Proxy component with a receive block can be inserted in the schedule of the second host H2 before the second control block b. The Net Proxy blocks are configured that the send block of the first host H1 sends data to the designated port of the receive block on the second host H2. The receive block is configure to listen on that port.

In accordance with an exemplary embodiment, the configuration of the first host H1 can be defined by the XML file according to FIG. 5. The configuration of the second host H2 can be analogously defined by the XML file according to FIG. 6.

In FIG. 7, an exemplary environment is illustrated schematically. The application running on the first host H1 can execute a part of the functionality (function B) on the second host H2. A third host H3 is shown in FIG. 7, whereby the third host H3 is not involved in that particular application, but also allows the execution of that functionality (function B). The second host H2 and the third host H3 can be redundant units.

In accordance with an exemplary embodiment, if the second host H2 crashes, the controller module 7 can react by reconfiguring the first host H1 such that component A communicates with the redundant copy of B on the third host H3. The resulting new configuration is illustrated in FIG. 8. In FIG. 9, the updated XML file for the first host H1 is shown. In FIG. 10, the updated XML file for the third host H3 is shown.

The controller module 7 can determine the changed configurations as follows. When the new configurations are sent to the first host H1 and the second host H2, for example by the change manager system 11, the controller module 7 receives all reconfiguration traffic, which has to be decrypted if appropriate, and therefore a copy of the new configuration files is available in the controller module 7. Thereafter, the controller module 7 executes a series of XPath queries, which means that newly received configurations are checked against these queries.

Get IP address of host for which the configuration is changed.

/configuration/@IP

Get all target IPs and ports to which the first host H1 sends data.

/configuration//target[@host]

This reveals for the configuration of the first host H1 the following information.

IP address of host that is undergoing a configuration change:

10.0.0.1

IP addresses and ports that the host requires to send messages to:

<target host="10.0.0.3" port="80" />

Using this information, the controller module 7 can update the configuration for the individual network security devices.

Figure 11:
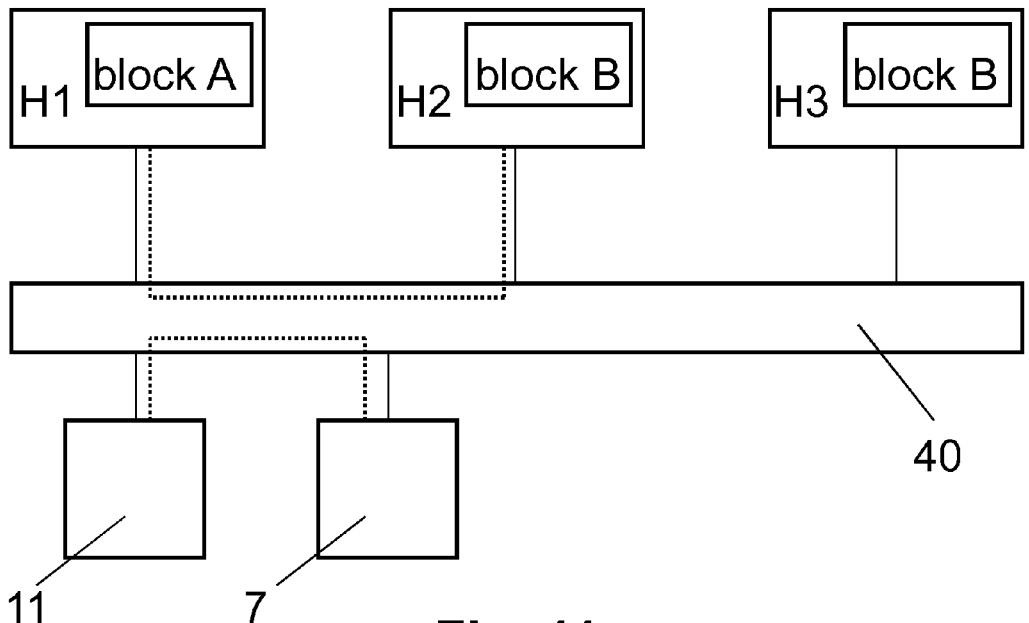
FIG. 11 shows an exemplary original operation of a system with a first and a second host from the system level perspective.

FIG. 11 shows an exemplary original operation of a system from the system level perspective. A first, a second, and a third host H1, H2, H3 are arranged, which may be configured to provide applications and functionalities for running an industrial control system, such as to provide one or more production control units 51, 52 53, 61, 62, 63, 64. The hosts H1, H2, H3 may be connected to a network/security control system 40, which may include one or more network units 41, 42, 43. A change manger system 11 and a controller module 7 may be connected to the network/security control system 40. In the example illustrated in FIG. 11, the first host H1 is allowed to communicate with the second host H2, which is illustrated by the dotted lines in FIG. 11. The change manger system 11 is not allowed to directly communicate with the hosts H1, H2, H3, but only with the controller module 7, which is illustrated with the dotted lines in FIG. 11. The third host H3 is not allowed to communicate to any other host and is configured as a redundant system.

In accordance with an exemplary embodiment, in case of a failure of the second host H2, for example because of an interruption of a network line, a failure of a host device, or a system crash, the system can adapt itself to such disturbance. For example, the first host H1 will notice this as no acknowledgement from the second host H2 is received anymore. In this case, the first host H1 may be configured to establish a communication to the controller module 7 in order to open a communication path to the change manager system 11.

Figure 12:
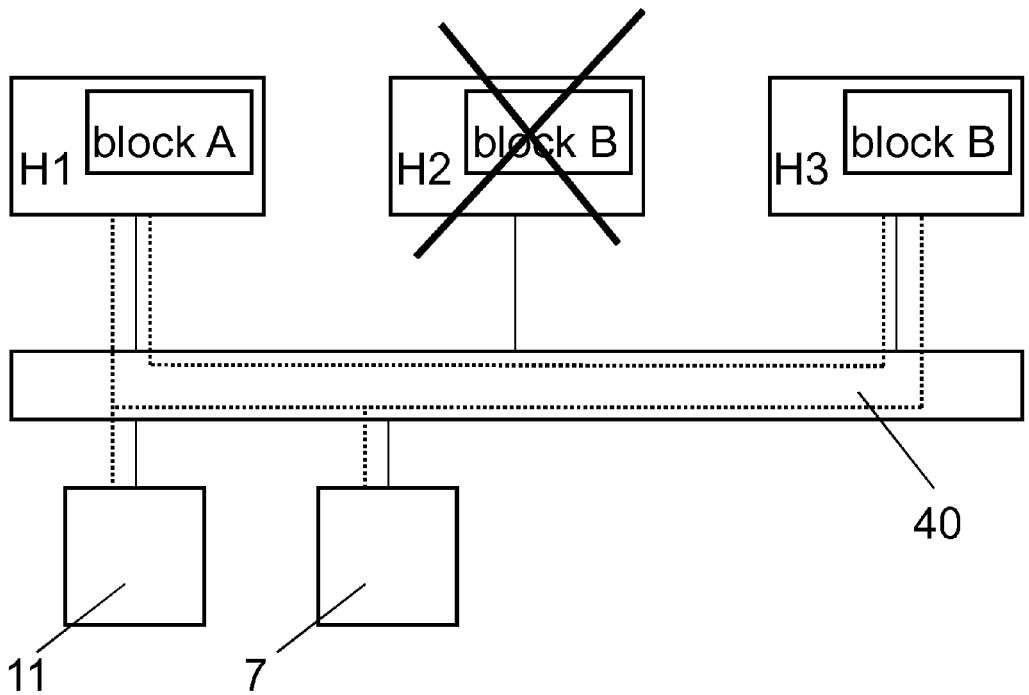
FIG. 12 shows the resulting application flow after breakdown of the second host.

In FIG. 12, the resulting application flow is shown. For example, the change manager system 11 may require that the first host H1 to be reconfigured, such that control block B of the third host H3 is used instead of the control block B of the second host H2. The controller module 7 can determine and put into effect the changes, wherein, for example, the security controls of the network/control system 40 are set to enable communication between the change manager system 11 and the first as well as the third host H1, H3. Moreover, a communication between the first host H1 and the third host H3 may be enabled as well. The corresponding communication paths are indicated in FIG. 12 with dotted lines. On the basis of these communication paths, the first host H1 and the third host H3 are reconfigured accordingly, wherein, for example, the changed configurations are stored in the change manager system 11. Thereafter, the controller module 7 reconfigures the security controls of the network/control system 40 such that direct communication between the change manager system 11 and the first host H1 as well as the third host H3 is disallowed. Moreover, for example communication with the second host H2, which has failed, may be disallowed as well.

Figure 13:
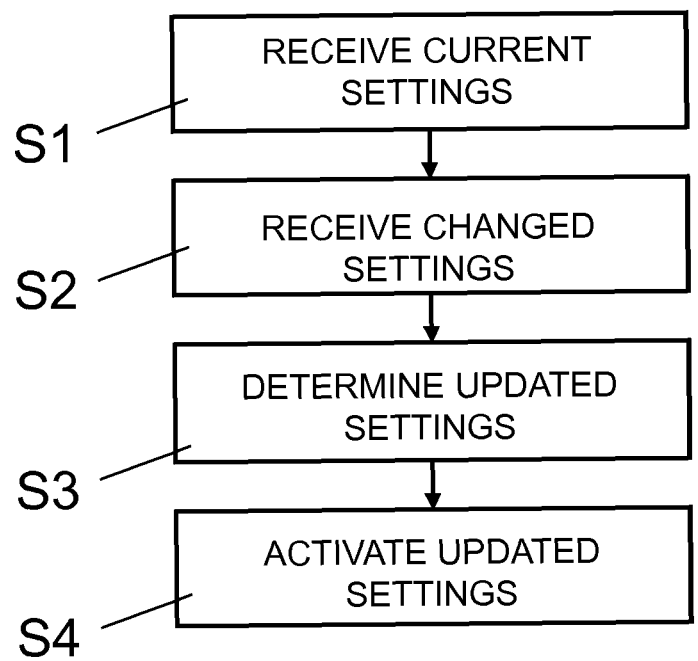
FIG. 13 shows a flow diagram illustrating an exemplary sequence of steps of a method for dynamically configuring an industrial controls system.

In FIG. 13, an exemplary sequence of steps of a method for the dynamic configuration of an industrial control system. In step S1 current configuration and security settings of the industrial control system are received. In step S2 changed configuration settings are received. In step S3 updated configuration and security settings are determined on the basis of current configuration and security settings and changed configuration settings. In step S4, at least one communication path is dynamically established in order to activate the updated configuration and security, such that the industrial control system is configured with the updated configuration and security settings.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for dynamic re-configuration of an industrial control system including production control units interconnected via network units, comprising:
    determining current configuration and security settings of the industrial control system;
    proposing changes to a production control unit of the industrial control system;
    determining, based on the current configuration and security settings and the proposed changes, updated configuration and security settings for the network units of the industrial control system; and
    dynamically establishing at least one communication path to the production control unit, by activating the updated configuration and security settings for the network units of the industrial control system.

2. The method according to claim 1, wherein an application of the industrial control system includes first and second components executed on first and second hosts, respectively, comprising:
    proposing changes including re-assignment of the second component from the second host to a third host of the industrial control system; and
    establishing a communication path from the first host to the third host by activating the updated configuration and security settings for the network units of the industrial control system.

3. A controller module for the dynamic configuration of an industrial control system, comprising:
    a current settings receiver configured to receive current configuration and security settings of the industrial control system;
    a changed settings receiver configured to receive changed configuration settings of the industrial control system;
    a settings analyzer configured to determine, based on the current configuration and security settings and the changed configuration settings, updated configuration and security settings of the industrial control system; and
    a dynamic activator configured to dynamically establish at least one communication path in order to activate the updated configuration and security settings of the industrial control system.

4. The controller module according to claim 3, wherein the changed settings receiver is configured to capture changed configuration settings transmitted by a change manager system.

5. The controller module according to claim 3, wherein the changed settings receiver is configured to detect changed configuration caused by a change in status of at least one of:
    network units and production control units of the industrial control system.

6. The controller module according to claim 4, wherein the changed settings receiver is configured to detect changed configuration caused by a change in status of at least one of:
    a network unit and a production control unit of the industrial control system.

7. The controller module according to claim 3, wherein the settings analyzer is configured to determine updated configuration and security settings based on at least one of:
    a redundant network unit and a redundant production control unit of the control system.

8. The controller module according to claim 6, wherein the settings analyzer is configured to determine updated configuration and security settings based on at least one of:
    a redundant network unit and a redundant production control unit of the control system.

9. The controller module according to claim 3, wherein the dynamic activator is configured to open at least one temporary communication path between the settings activator and at least one of:
    a network unit and a production control unit of the control system in order to activate updated configuration and security settings of the control system.

10. The controller module according to claim 8, wherein the dynamic activator is configured to open at least one temporary communication path between the settings activator and at least one of:
    a network unit and a production control unit of the control system in order to activate updated configuration and security settings of the control system.

11. The controller module according to claim 3, wherein the settings analyzer is configured to determine updated configuration and security settings based on at least one of:
    a redundant network unit and a redundant production control unit of the control system.

12. The controller module according to claim 10, wherein the settings analyzer is configured to determine updated configuration and security settings based on at least one of:

a redundant network unit and a redundant production control unit of the control system.

13. The controller module according to claim 3, wherein the changed settings receiver is configured to receive changed security settings of the control system, and wherein the settings analyzer is configured to determine based on changed security settings, updated configuration and security settings of the control system.

14. The controller module according to claim 12, wherein the changed settings receiver is configured to receive changed security settings of the control system, and wherein the settings analyzer is configured to determine, based on the changed security settings, updated configuration and security settings of the control system.

15. The controller module according to claim 3, comprising:
an updated settings transmitter for transmitting updated configuration and security settings to a change manager system.

16. The controller module according to claim 14, comprising:
an updated settings transmitter for transmitting updated configuration and security settings to a change manager system.

17. A computer program product comprising a non-transitory computer-readable medium having stored thereon computer program code which upon execution will cause a controller module to:

receive current configuration and security settings of an industrial control system;

receive changed configuration settings of the industrial control system;

determine, based on current configuration and security settings and changed configuration settings, updated configuration and security settings of the industrial control system; and dynamically establish at least one communication path in order to activate the updated configuration and security settings of the industrial control system.

18. The computer program product of claim 17, in combination with an application for an industrial control system which includes first and second components executed on first and second hosts, respectively, wherein the computer program product and application will, upon execution, cause the controller module and/or first and second hosts to:

propose changes including re-assignment of the second component from the second host to a third host of the industrial control system; and establish a communication path from the first host to the third host by activating the updated configuration and security settings for network units of the industrial control system.

* * * * *